J. T. BRENEMAN.
RAISING SUNKEN SHIPS.
APPLICATION FILED DEC. 26, 1918.
1,324,336.
Patented Dec. 9, 1919.
7 SHEETS—SHEET 7.
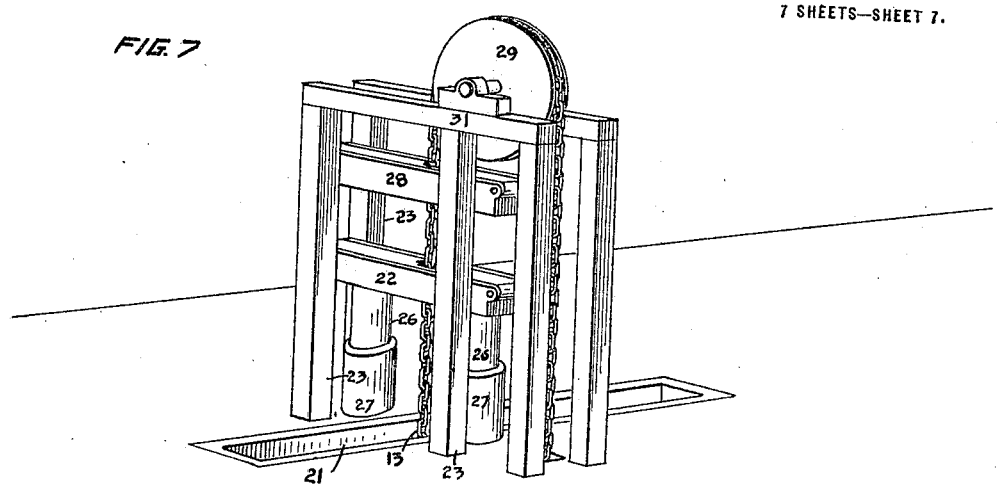
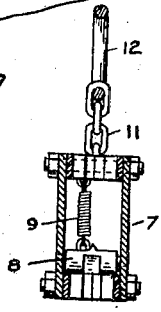
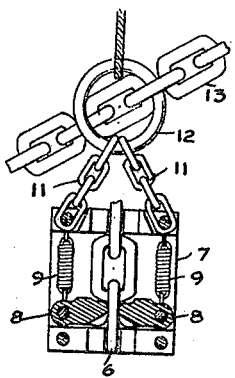
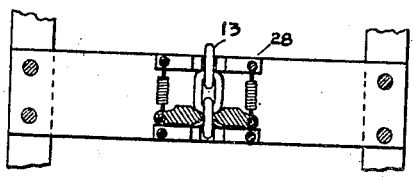
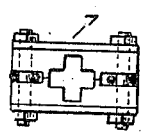
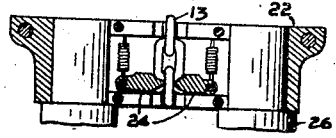
INVENTOR
J. T. BRENEMAN
BY
F. M. Wright,
ATT'Y.

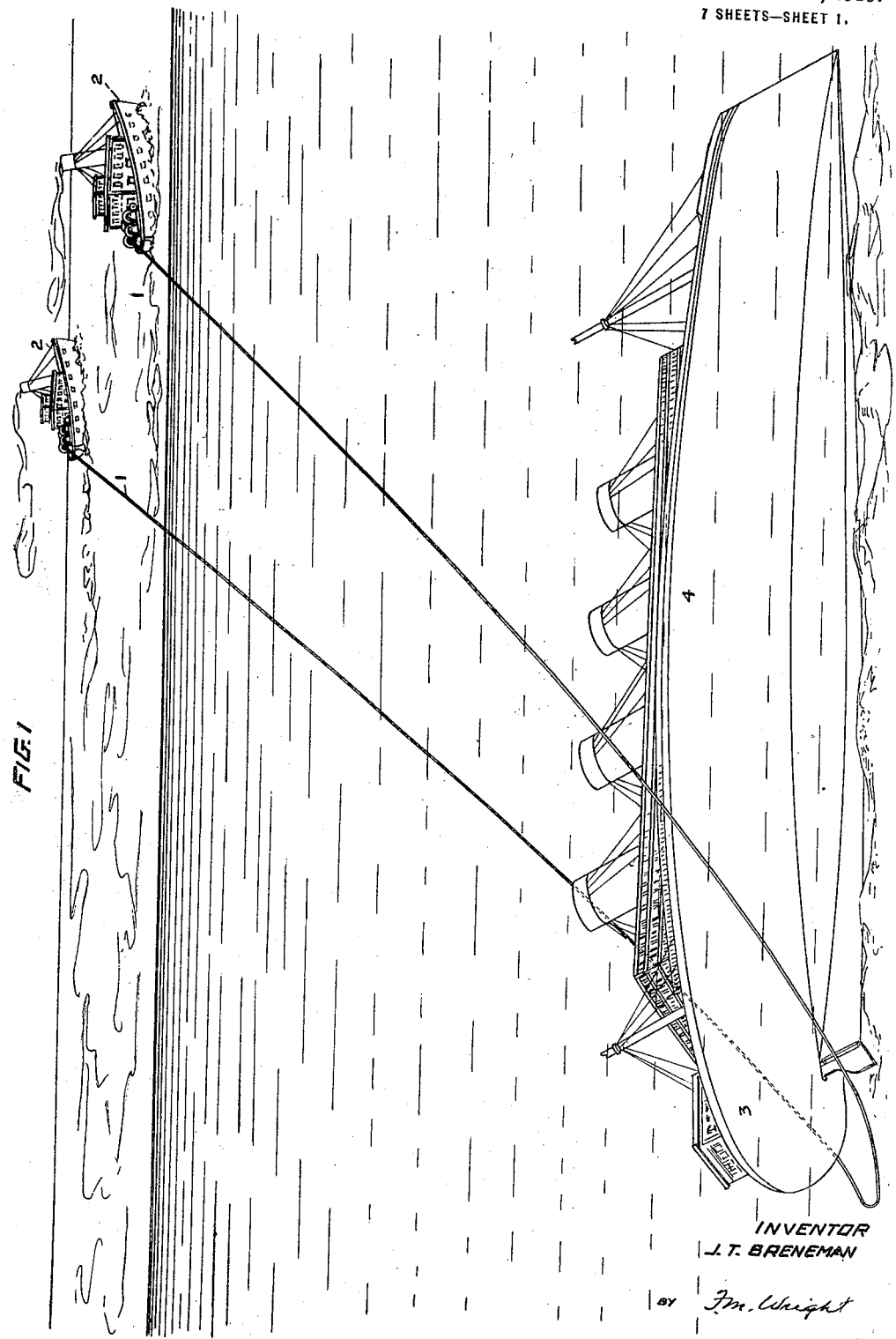

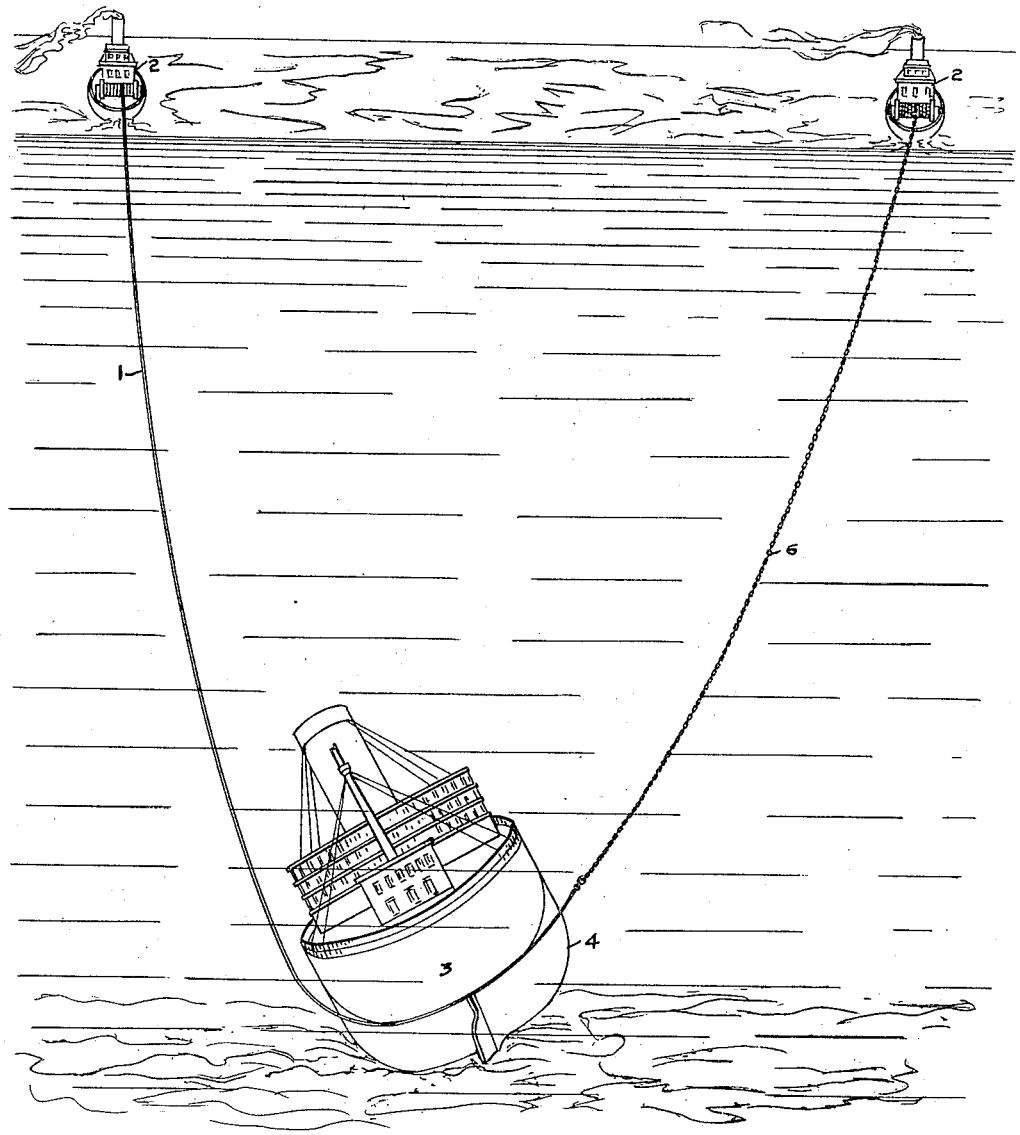

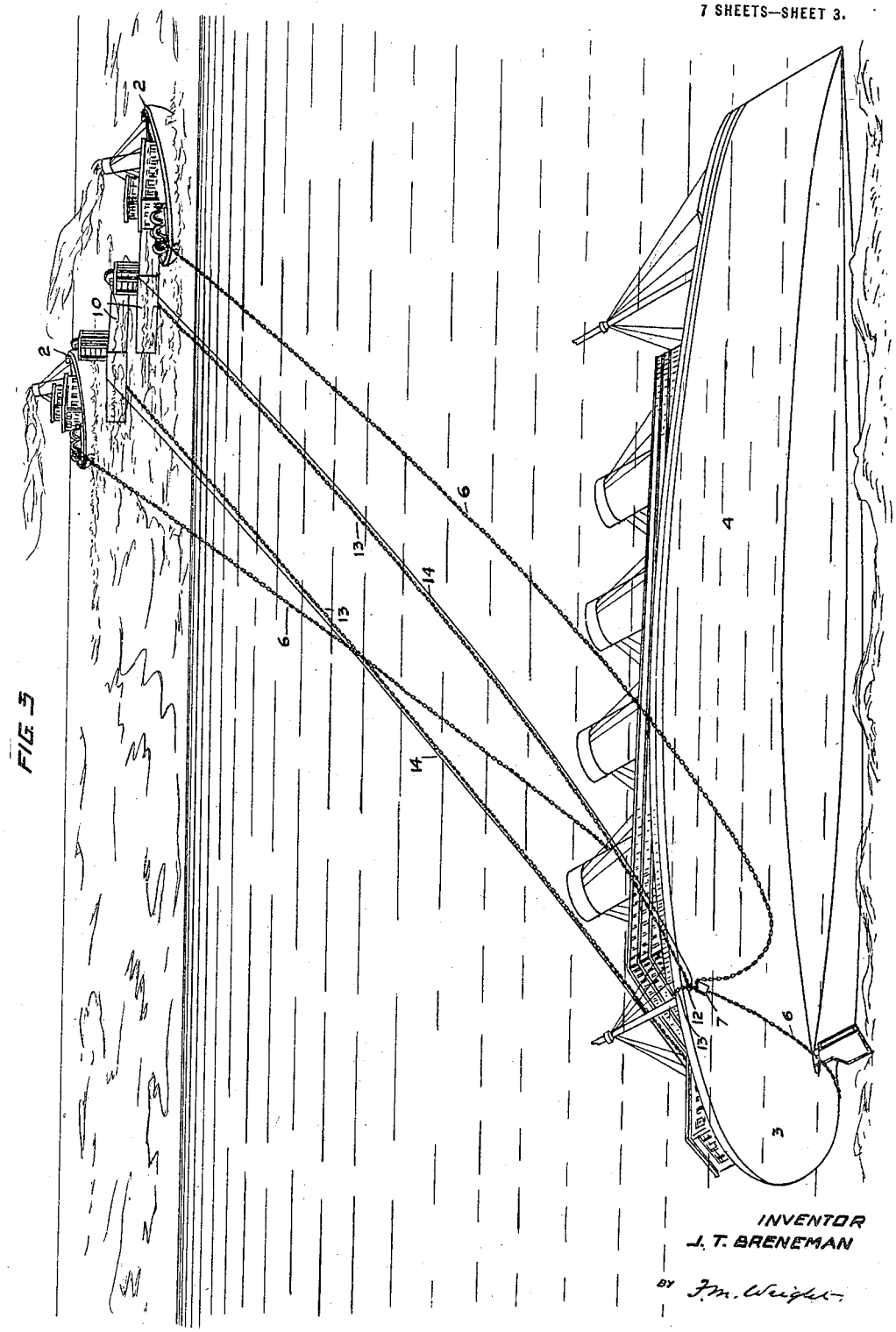

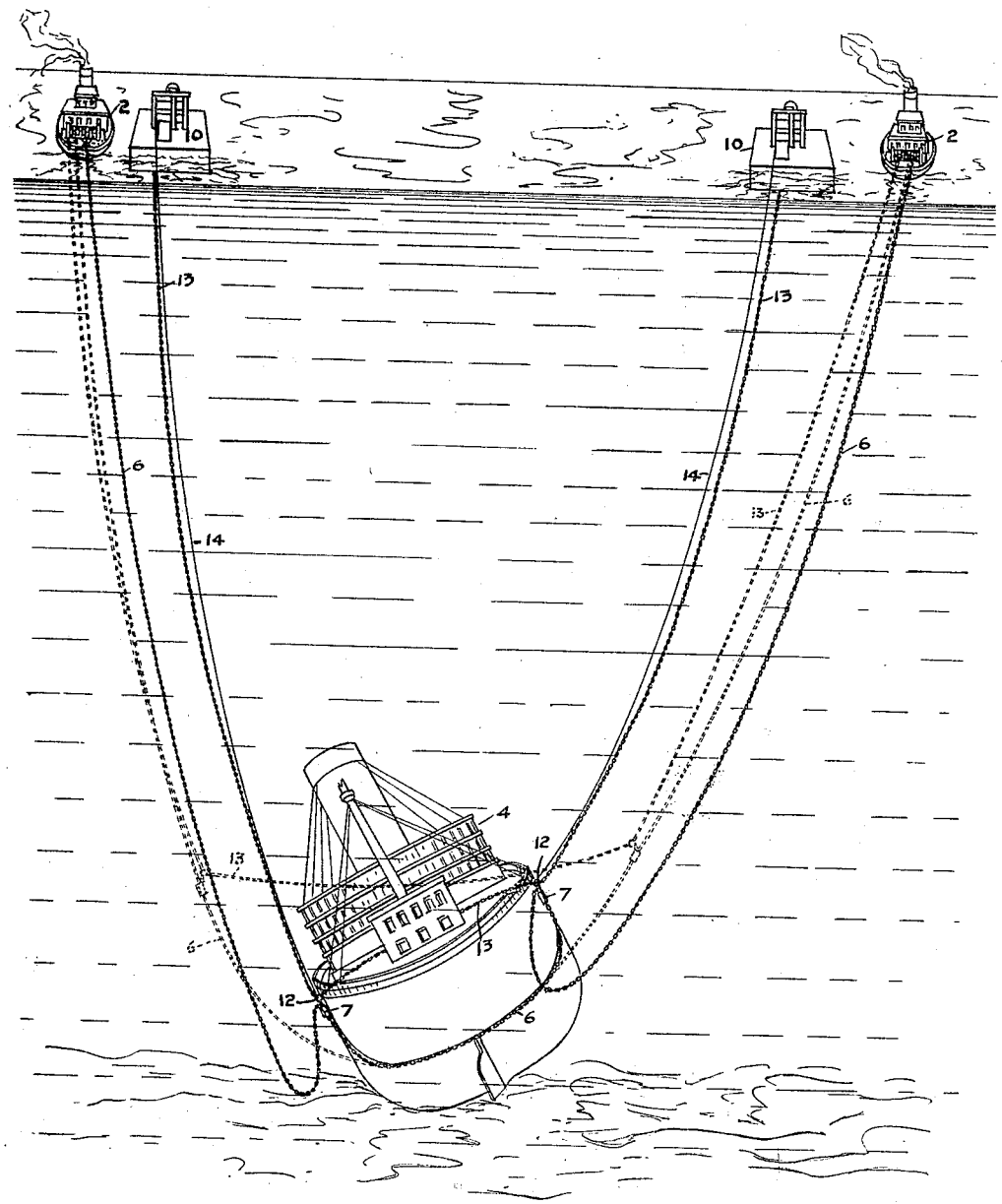

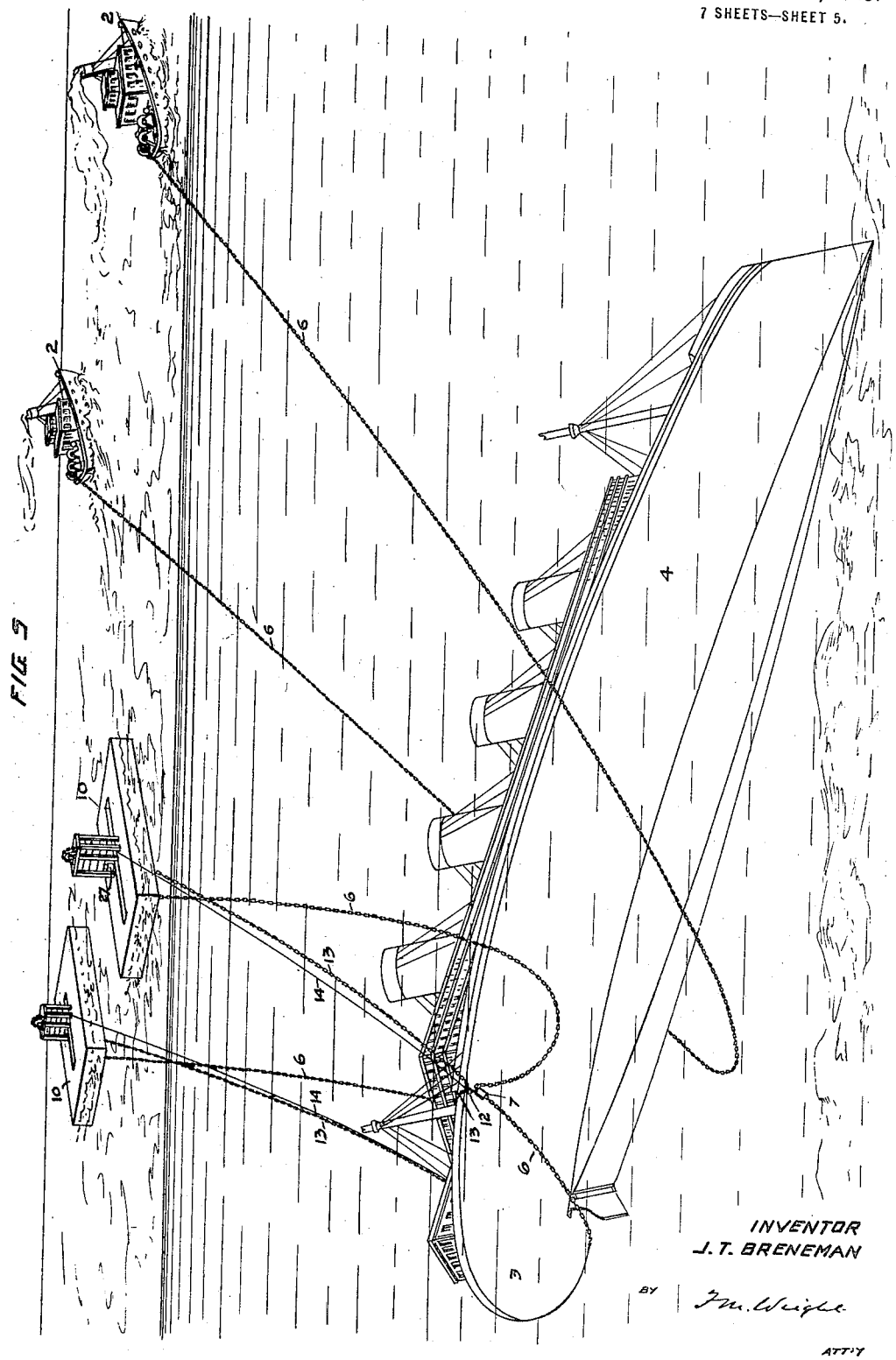

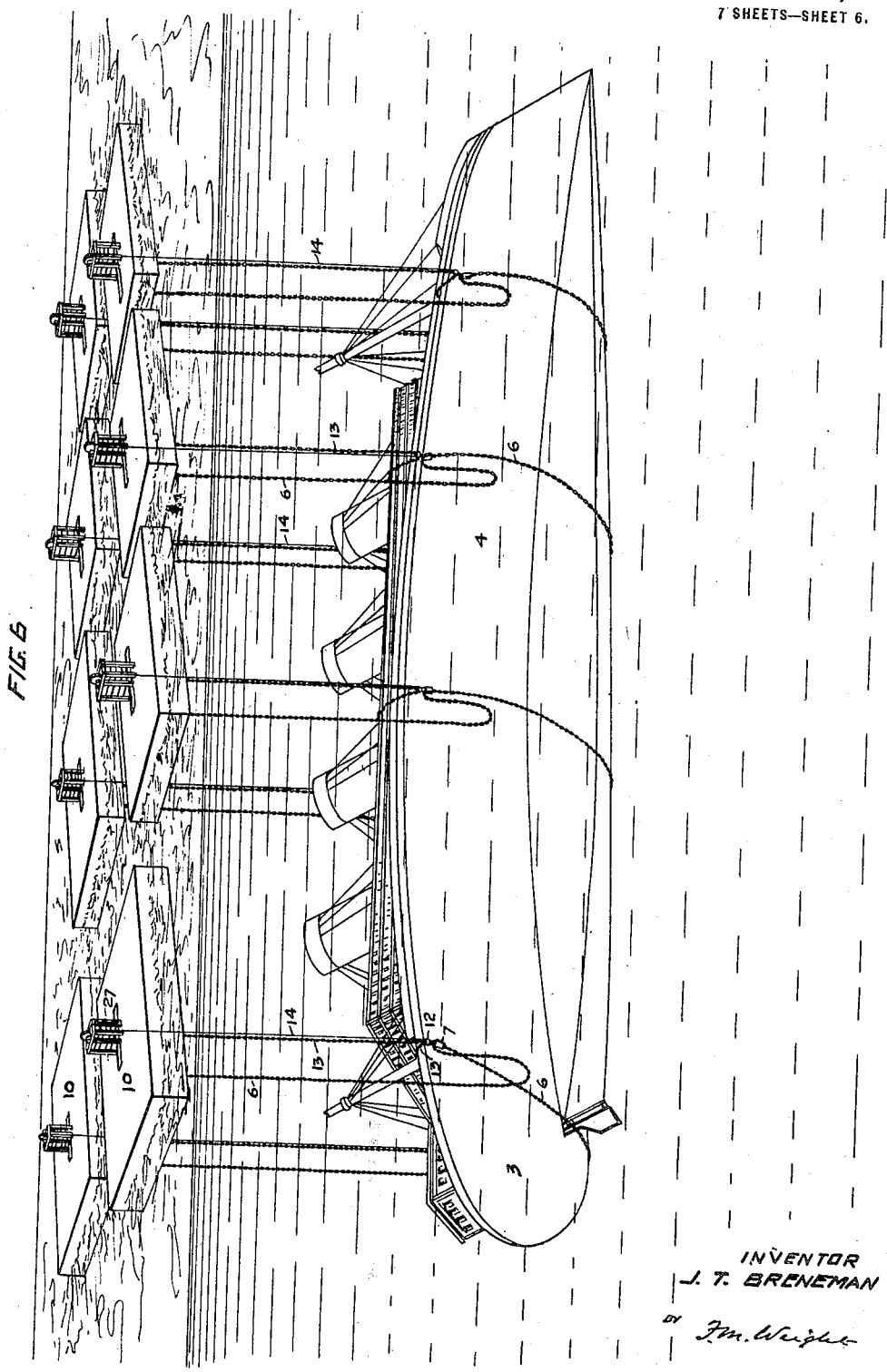

UNITED STATES PATENT OFFICE.

JOSEPH T. BRENEMAN, OF EL CERITO, CALIFORNIA.

RAISING SUNKEN SHIPS.

1,324,336. Specification of Letters Patent. Patented Dec. 9, 1919.

Application filed December 26, 1918. Serial No. 268,271.

*To all whom it may concern:*

Be it known that I, JOSEPH T. BRENEMAN, a citizen of the United States, residing at El Cerito, in the county of Contra Costa and State of California, have invented new and useful Improvements in Raising Sunken Ships, of which the following is a specification.

The object of the present invention is to provide an improved method of, and means for, raising ships, especially those which are sunk to a depth at which a diver cannot successfully operate.

In the accompanying drawings, Figure 1 is a vertical sectional view of a body of water, showing a vessel, sunk therein, and showing the first step in the improved method of raising said vessel; Fig. 2 is a similar view, taken from the rear of said vessel; illustrating the second step of said method; Figs. 3 and 4 are similar views, taken from a side and rear, respectively, of said vessel, illustrating the third step; Fig. 5 is a view, similar to Fig. 3, illustrating the fourth step; Fig. 6 is a view, similar to Figs. 3 and 5, illustrating a later step; Fig. 7 is a perspective view of a barge having thereon a hydraulic elevator; Figs. 8 and 9 are vertical sections, taken at right angles to each other of a block; Fig. 10 is a plan view thereof; Fig. 11 is a vertical longitudinal section of a stationary clutch; Fig. 12 is a similar view of a movable clutch.

Supposing that it is desired to raise a sunken vessel which has been sunk to a depth of over 200 feet, and the direction of sailing or steaming of which when sunk is known, such as, for instance, the Lusitania, the first operation according to my invention is to lower the middle portion of a cable 1 to the bed of the sea, the respective ends of cable being carried by two vessels 2 at about three or four hundred feet apart. This cable is dragged over the bed of the sea in such a direction as, if possible, to engage the stern 3 of the sunken vessel 4 as shown in Fig. 1. Large steamships, such as the Lusitania, have at their stern a considerable over-hang, of twenty or thirty feet or more. When the resistance of the cable dragging along the bottom indicates that it has engaged the stern 3 of the sunken vessel, a strong chain 6, such as is capable of supporting the weight of about one-quarter of that of the sunken ship to be raised, is attached to the end of the cable on one of the vessels, and the cable is wound up on the other vessel, as shown in Fig. 2, thus drawing the chain 6, instead of the cable 1, into place beneath the over-hanging stern of the ship. It is necessary to substitute a sufficiently strong chain for the cable because the cable will not usually be sufficiently strong to lift the weight of the vessel. However, a cable may be used, instead of a chain, since in any case a number of such chains or cables may be required to transmit the necessary lifting force. The ends of the chain 6, instead of the ends of the cable 1, being now supported upon the two vessels 2, there is slipped over each end of the chain 6 a block 7, shown in detail in Figs. 8, 9, 10, carrying therein at one end two pivoted dogs 8, actuated by springs 9, and arranged so that the block 7 can easily slip over the chain 6, downwardly, but cannot return upwardly, the dogs engaging each link of the chain in succession, as the block descends, so as to prevent such upward movement of the block on the chain. Attached to the end of each block opposite to that at which are pivoted the dogs 8 are short chains 11, which are connected to a ring 12. Through the rings 12 of the two blocks is passed a strong chain 13, the ends of which are supported, as hereinafter described, upon barges 10. These barges are shifted into such a position that, as shown in Figs. 3 and 4, the second chain 13, thus passing through said rings 12, drops down upon the deck of the sunken vessel 4, considerably, say 100 feet, in advance of the first named chain 6. The middle portion of the second chain 13 will therefore probably rest upon the deck of the said vessel 4 in front of a mast or a funnel of said vessel. The blocks 7 are lowered by cables 14 so as to control their descent, and they should be allowed to descend upon the first-named chain 6 as deep as possible. Then, upon pulling upon the ends of the chain 13, the pull will be transmitted to the blocks by means of the rings 12. But these blocks are prevented by the dogs 8 from moving upwardly on the first-named chain 6. It results that, as shown in Figs. 3 and 4, said chains 6 and 13 form a band tightly encircling the rear portion of the ship, passing over the deck of the ship, probably in front of a funnel or a mast, then by the sides of the ship, and then beneath its over-hanging stern. The portions of the first chain 6 above the blocks are now no longer of any service for raising the ship and can be lowered into the water, but the portion extending down from the blocks can be used for raising the rear portion of the ship. Even should the second chain not be held from slipping rearwardly by engagement with the lowest portion, extending above the deck, of a mast or a funnel, it will be so held by friction alone, for the rear portion of the sunken ship will be sufficiently gripped by the chains 6 and 13 and the blocks 7. Much less power is required to raise the rear portion only of the ship than would be required to raise the whole ship; but in the case of a large ship, such as the Lusitania, it would be probably preferable to encircle the stern of the ship with a number, say six, of such chains before attempting to lift it. When so encircled, said rear portion can be raised by means of these chains 6 and 13 and blocks 7, in any desired manner.

I have shown in Fig. 5 one such manner of raising the rear portion of the ship. As shown in said figure, each upper end of the chain 13 will pass upwardly through a well 21 centrally located in a barge or float 10 and then through a clutch 22 moving vertically in guides 23, and having spring actuated dogs 24 to engage the chain, said clutch being raised by the plungers 26 of hydraulic elevators 27 on barges. When said plungers are raised by hydraulic pressure, then, by means of the dogs 24 of the clutches 22, they raise the ends of the chain 13, and thereby permit each terminal portion of the chain to travel through a stationary clutch 28 and over a pulley 29 rotatably mounted on the top of the guide or frame 31, and then to the hold of the barge, wherein they are coiled.

Since the clutch 28 is stationary, it results that, when an end of the chain 13 has been drawn through said clutch, it is held thereby and prevented from dropping again.

When the stern end of the vessel has been raised in the manner above described, it is a comparatively easy matter to draw other cables and chains beneath the keel of the vessel to a point in advance of the first-named chain 6, and in the manner already described form loops or bands around the vessel, part of each of which is formed by a chain, the ends of which are supported upon the surface of the sea by floats on which are hydraulic elevators 27. When a sufficient number of such floats, chains and bands have been brought into use, the sunken vessel can be raised to the surface of the sea.

While the non-returnable catches herein shown are adapted for engagement only with chains, it is understood that the invention is not limited thereto, but can be applied by means of non-returnable catches in the broad sense of the term and which can operate with lines.

I claim:

1. The method of raising a sunken ship, which consists in lowering a line to the bottom of the body of water in which the ship is sunk, dragging said line along said bottom until it engages a projecting lower portion of the ship, lowering on the ends of said line non-returnable catches having loops through which extends a second line, supporting the ends of this second line by floats on the surface of the body of water, thus forming a band closely gripping said projecting portion of the ship, and then, by means of said second line, raising said portion of the ship from the bottom, then raising the remainder of the ship from the bottom and then raising the whole of the ship to the surface of the water.

2. The method of raising a sunken ship, which consists in lowering a line to the bottom of the body of water in which the ship is sunk, dragging said line along said bottom until it engages a projecting lower portion of the ship, lowering on the end of said line non-returnable catches having loops through which extends a second line, supporting the ends of this second line by floats on the surface of the body of water, thus forming a band closely gripping said projecting portion of the ship, and then, by means of said second line, raising said portion of the ship from the bottom, applying the same method to other portions of the ship and then bodily raising the ship.

JOSEPH T. BRENEMAN.